2,977,342
Patented Mar. 28, 1961

2,977,342
SYNTHETIC LINEAR POLYAMIDES IN FINELY DIVIDED FORM

Harry James Twitchett and Arthur Scott Wild, Manchester, England, assignors to Imperial Chemical Industries Limited, London, England, a corporation of Great Britain No Drawing. Filed Oct. 27, 1958, Ser. No. 769,587
Claims priority, application Great Britain Oct. 30, 1957
5 Claims. (Cl. 260—78)

This invention relates to synthetic polyamides and more particularly it relates to a process for the manufacture of synthetic polyamides in a finely divided form.

The addition of water to solutions of synthetic polyamides in water miscible solvents results in precipitation of the synthetic polyamide in a form which is not finely divided but is usually fibrous in character. It is difficult to convert such a fibrous precipitate into a finely divided form by milling. Processes which have hitherto been used for the production of synthetic polyamides in a finely divided form involve heating the polyamide with organic solvents at high temperature and subsequently cooling the solution. Such processes degrade and discolour the synthetic polyamide. Furthermore it is difficult to control such processes in such a way as to produce particles of uniform size.

According to the invention there is provided a process for the manufacture of synthetic polyamides in a finely divided form which comprises adding a dilute aqueous solution of formic acid to a solution of the synthetic polyamide in formic acid or in a concentrated aqueous solution of formic acid and isolating the finely divided synthetic polyamide which is precipitated.

As examples of synthetic polyamides which may be used in the process of the invention there may be mentioned polyhexamethyleneadipamide and polycaproamide.

When a concentrated aqueous solution of formic acid is used for dissolving the synthetic polyamide this should contain not less than 80% by weight of formic acid and preferably not less than 85% of formic acid. The dilute aqueous solution of formic acid used for precipitating the polyamide should contain not more than 45% by weight of formic acid and preferably between 17.5% and 45% by weight of formic acid.

The amount of the dilute aqueous solution of formic acid required for precipitating the synthetic polyamide from the solution in formic acid is such as to give a mixed aqueous solution of formic acid in which the particular synthetic polyamide is not appreciably soluble. The most satisfactory results are obtained when the mixed aqueous solution of formic acid contains between 45% and 70% by weight of formic acid.

The formic acid used need not be pure and may, for example, contain small amounts of other water miscible solvents such as acetic acid or alcohol.

The process of the invention is conveniently carried out at atmospheric temperatures (although temperatures up to 50° C. may be employed if desired) by dissolving a synthetic polyamide in formic acid or in a concentrated aqueous solution of formic acid containing not less than 80% by weight of formic acid, adding such an amount of a dilute aqueous solution of formic acid, containing between 17.5% and 45% by weight of formic acid, that the resulting mixed solutions of formic acid contain between 45 and 70% by weight of formic acid, filtering off the finely divided synthetic polyamide which is precipitated, washing with water and, if desired, drying the product.

The finely divided synthetic polyamide so obtained consists of small particles of uniform size, and, when dry, the product may be used as a moulding powder. It may also be used, preferably before drying, for incorporation with pigments. Pigment mixtures so obtained are of value for the mass colouration of synthetic polyamides and synthetic polyesters and may also be used for the preparation of coating compositions for application to paper or textiles or for the colouration of polymeric materials suitable for moulding or extrusion.

After isolation of the finely divided synthetic polyamide, the formic acid liquors (containing between 45 and 70% by weight of formic acid) contain such small quantities of synthetic polyamide in solution) that without any further treatment, they are suitable for use in the chemical industry, in processes where an aqueous solution of formic acid is required.

The process of the invention provides an economical and facile method for obtaining synthetic polyamides in the form of small particles of uniform size, and does not result in any appreciable discolouration or degradation of the synthetic polyamide.

The invention is illustrated but not limited by the following examples in which the parts and percentages are by weight.

Example 1

To a solution of 63 parts of polyhexamethyleneadipamide in 425 parts of 85% formic acid at atmospheric temperature there are added with stirring 394 parts of a dilute aqueous solution of formic acid containing 45% of formic acid. The mixture is stirred for 30 minutes, then allowed to stand for 20 hours and the polyhexamethyleneadipamide which is precipitated in the form of fine particles is filtered off and washed with 10,000 parts of water.

The aqueous paste which contains particles of size between $5\mu$ and $50\mu$ is then dried at between 90 and 100° C. Polyhexamethyleneadipamide is obtained in the form of a white powder.

Example 2

To a solution of 120 parts of polycaproamide in 600 parts of 90% formic acid at atmospheric temperature there are added with stirring 521 parts of a dilute aqueous solution of formic acid containing 21% formic acid.

There are then added 248 parts of a dilute aqueous solution of formic acid containing 17.5% formic acid and the mixture so obtained is stirred for 30 minutes, then allowed to stand for 20 hours and the polycaproamide which is precipitated in the form of fine particles is filtered off and washed with 12,000 parts of water. The resulting aqueous paste which contains particles varying in size from $5\mu$ to $50\mu$ is then dried at between 90° and 100° C. Polycaproamide is obtained in the form of a white powder.

Example 3

To a solution of 63 parts of polyhexamethyleneadipamide in 380 parts of 95% formic acid at 30° C. there are added with stirring 240 parts of a dilute aqueous solution of formic acid containing 17.5% of formic acid. The mixture is stirred for 30 minutes, then allowed to stand for 20 hours and the polyhexamethyleneadipamide which is precipitated in the form of fine particles is filtered off and washed with 10,000 parts of water.

The aqueous paste so obtained is suitable for milling with pigments to produce pigment compositions which may be used in the mass colouration of polyhexamethylene adipamide.

Example 4

To a solution of 63 parts of polyhexamethyleneadipamide in 425 parts of 85% formic acid at atmospheric temperature there are added with agitation 618 parts of a dilute aqueous solution of formic acid containing 17.5% of formic acid. The mixture is stirred for 30 minutes then allowed to stand for 20 hours and the polyhexamethyleneadipamide which is precipitated in the form of fine particles is filtered off and washed with 10,000 parts of water.

The aqueous paste so obtained is suitable for milling with pigments to produce pigment compositions which may be used in the mass colouration of polyhexamethylene adipamide.

What we claim is:

1. A process for the manufacture of synthetic linear polyamides selected from the group consisting of polycaproamide and polyhexamethyleneadipamide in a finely divided form which comprises adding a dilute aqueous solution of formic acid containing between 17.5 and 45% formic acid to a solution of the synthetic linear polyamide in a solvent selected from the group consisting of formic acid and concentrated aqueous solutions of formic acid containing not less than 80% formic acid and isolating the finely divided synthetic polyamide which is precipitated, the resulting mixture of formic acid solutions containing between 45% and 70% by weight of formic acid.

2. Process according to claim 1 wherein the concentrated aqueous solution of formic acid contains not less than 85% by weight of formic acid.

3. Process according to claim 1 wherein the synthetic polyamide is polyhexamethylene adipamide.

4. Process according to claim 1 wherein the synthetic polyamide is polycaproamide.

5. A process for the manufacture of synthetic linear polyamides in a finely divided form which comprises adding, at a temperature not greater than 50° C., a dilute aqueous solution of formic acid containing between 17.5% and 45% formic acid to a solution of a synthetic linear polyamide selected from the group consisting of polyhexamethyleneadipamide and polycaproamide in a solvent selected from the group consisting of formic acid and aqueous solutions of formic acid containing not less than 80% formic acid, filtering off the finely divided synthetic linear polyamide which is thereby precipitated and then drying the precipitated product, the mixture of formic acid solutions resulting from said addition step containing between 45% and 70% by weight of formic acid.

References Cited in the file of this patent

UNITED STATES PATENTS

| | | |
|---|---|---|
| 2,335,930 | Freeland | Dec. 7, 1943 |
| 2,342,387 | Catlin | Feb. 22, 1944 |
| 2,360,406 | Dreyfus et al. | Oct. 17, 1944 |
| 2,388,278 | Moncrieff et al. | Nov. 6, 1945 |
| 2,473,920 | Taylor | June 21, 1949 |
| 2,489,569 | Foulds et al. | Nov. 29, 1949 |

FOREIGN PATENTS

| | | |
|---|---|---|
| 688,771 | Great Britain | Mar. 11, 1953 |